(12) United States Patent
Kuwahara et al.

(10) Patent No.: US 12,330,659 B2
(45) Date of Patent: Jun. 17, 2025

(54) VEHICLE DRIVING SUPPORT SYSTEM AND VEHICLE DRIVING SUPPORT METHOD

(71) Applicant: Mazda Motor Corporation, Hiroshima (JP)

(72) Inventors: Junichiro Kuwahara, Aki-gun (JP); Yoko Hoshino, Aki-gun (JP); Michio Tanaka, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 361 days.

(21) Appl. No.: 17/740,352

(22) Filed: May 10, 2022

(65) Prior Publication Data

US 2022/0371601 A1    Nov. 24, 2022

(30) Foreign Application Priority Data

May 21, 2021    (JP) ................................ 2021-085879

(51) Int. Cl.
  *B60W 40/09*    (2012.01)
  *B60W 40/04*    (2006.01)
  *B60W 60/00*    (2020.01)
(52) U.S. Cl.
  CPC ............ *B60W 40/09* (2013.01); *B60W 40/04* (2013.01); *B60W 60/0015* (2020.02); *B60W 2540/30* (2013.01); *B60W 2554/20* (2020.02); *B60W 2554/40* (2020.02); *B60W 2556/10* (2020.02)
(58) Field of Classification Search
  CPC .. B60W 40/09; B60W 40/04; B60W 60/0015; B60W 2540/30; B60W 2554/20; B60W 2554/40; B60W 2556/10; B60W 2050/146; B60W 50/14; B60W 60/0051
  See application file for complete search history.

(56) References Cited

U.S. PATENT DOCUMENTS

| | | | | |
|---|---|---|---|---|
| 2014/0039986 | A1* | 2/2014 | Handley | ............ G06Q 10/0639 705/7.42 |
| 2015/0066284 | A1* | 3/2015 | Yopp | ...................... B60K 28/06 701/29.2 |
| 2018/0284766 | A1* | 10/2018 | Minegishi | ............. B60W 50/12 |
| 2018/0284767 | A1* | 10/2018 | Minegishi | ............ B60W 30/182 |
| 2019/0093573 | A1* | 3/2019 | Kolhouse | .............. F02D 11/105 |
| 2022/0242450 | A1* | 8/2022 | Sokolov | ............. G06Q 10/0635 |

FOREIGN PATENT DOCUMENTS

JP    2010-100138 A    5/2010

* cited by examiner

*Primary Examiner* — Anne Marie Antonucci
*Assistant Examiner* — Luis G Del Valle
(74) *Attorney, Agent, or Firm* — XSENSUS LLP

(57) ABSTRACT

A vehicle driving support system evaluates the ability of a driver based on the driving operation of the driver for each of a plurality of driving-related functions possessed by the driver to drive the vehicle. In addition, the vehicle driving support system determines whether the ability of the driver is less than a predetermined standard for each of the driving-related functions and is not improved from then on, based on the past evaluation result of the ability of the driver. When determining that the ability of the driver is less than the predetermined standard for at least a part of the driving-related functions and is not improved from then on, the vehicle driving support system performs substitution control that causes a vehicle to perform the part of the driving-related functions instead so as to perform driving even if the driver does not exert the ability.

16 Claims, 7 Drawing Sheets

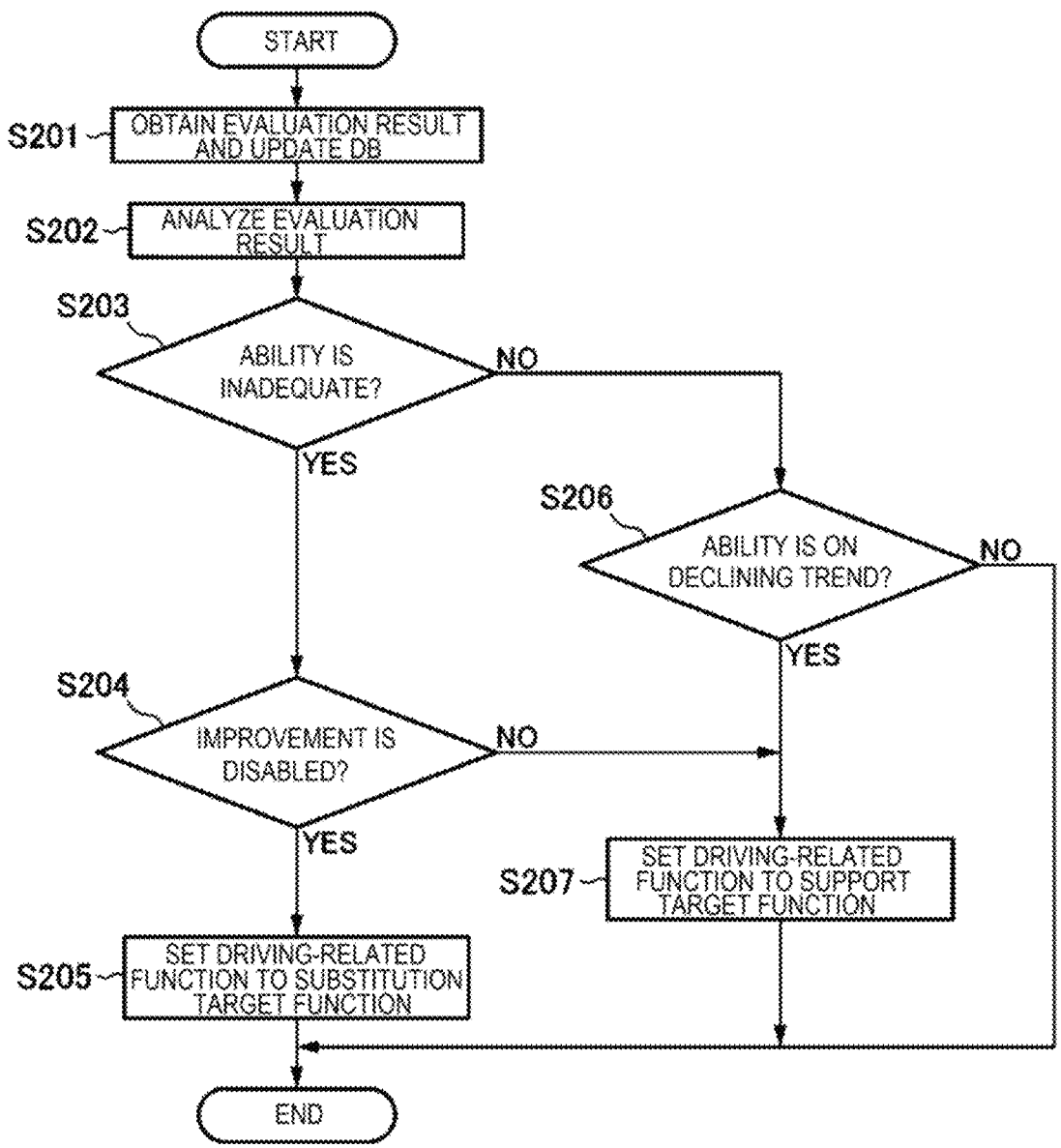

VEHICLE DRIVING SUPPORT SYSTEM AND VEHICLE DRIVING SUPPORT METHOD

CROSS-REFERENCE TO RELATED APPLICATION

The present application claims priority to Japanese Patent Application 2021-085879, filed May 21, 2021, the entire contents of which are incorporated herein by reference.

BACKGROUND

Field

The present disclosure relates to a vehicle driving support system and a vehicle driving support method, and more particularly, to a vehicle driving support system and a vehicle driving support method for driving support.

Description of the Related Art

Conventionally, vehicles capable of traveling by automatic driving (or autonomous driving) have been developed and, in such automatic driving techniques, vehicles operate themselves subjectively under certain conditions (SAE automatic driving level 3 or higher). That is, drivers do not need to operate vehicles through an accelerator, a brake, a steering wheel, and the like, and drivers are free from operating vehicles.

On the other hand, to suppress dependence or overconfidence of the driver on such a vehicle automatic driving technique, there is proposed a technique that determines whether an avoidance operation of the driver and an avoidance operation amount of the driver are appropriate based on the target route (preferred route to avoid obstacles) and the future route (route on which the driver will travel) calculated by the vehicle, and performs travel support when it is determined that the avoidance operation is appropriate and the avoidance operation amount is not appropriate or generates an alarm when it is determined that the avoidance operation is not appropriate (see, for example, patent document 1).

PRIOR ART DOCUMENTS

Patent Documents

[Patent document 1] JP-A-2010-100138

SUMMARY

Technical Problems

However, the technique described in patent document 1 only performs driving support and generates an alarm according to the avoidance operation and the avoidance operation amount of the driver when an obstacle is detected, and does not consider the current driving ability of the driver or the progression of the driving ability so far. Accordingly, the technique cannot perform appropriate driving support to maintain and improve the driving ability of the driver.

The present disclosure addresses such a problem with an object of providing a vehicle driving support system and a vehicle driving support method that can maintain and improve the driving ability of the driver.

Means for Solving the Problems

To achieve the object described above, a vehicle driving support system according to the present disclosure includes an ability evaluation unit that evaluates ability of a driver based on a driving operation of the driver for each of a plurality of driving-related functions possessed by the driver to drive a vehicle; a determination unit that, based on a past evaluation result of the ability of the driver, determines whether the ability of the driver is less than a predetermined standard and is not improved from then on for each of the driving-related functions; and a vehicle control unit that, when the determination unit determines that the ability of the driver is less than the predetermined standard for at least a part of the driving-related functions and is not improved from then on, performs substitution control for causing the vehicle to perform the part of the driving-related functions instead so as to perform driving even if the driver does not exert the ability.

According to the present disclosure configured as described above, the vehicle performs, instead of the driver, the exertion of the driving performance using a driving-related function of the driving-related functions for which the ability of the driver is determined to be less than the predetermined standard and not to be improved from then on. This can cause the vehicle to perform the function for which the driver has poor driving ability instead and exert the performance required for a travel so as to ensure the safety driving of the vehicle, and cause the driver to exert the driving performance for the function for which the driver has adequate driving ability without entrusting the vehicle. Accordingly, the driving ability of the driver can be maintained and improved through driving while a safety travel is ensured by automatic driving.

In addition, in the present disclosure, preferably, the driving-related functions include a perceptual function that perceives a traffic environment, a determination function that determines a driving operation required in the traffic environment, and an operation function that performs the driving operation.

According to the present disclosure configured as described above, since the driving-related functions are classified according to the processes of driving operations, the ability of the driver can be evaluated appropriately. Accordingly, the driving-related function to be subject to substitution control can be selected appropriately.

In addition, in the present disclosure, preferably, the ability evaluation unit evaluates the ability of the driver each time a travel starts and then ends, and the determination unit determines whether the ability of the driver is less than the predetermined standard and is not improved from then on for each of the driving-related functions based on the evaluation result of the ability of the driver over a plurality of times of travels.

According to the present disclosure configured as described above, it is possible to suppress effects of a temporary change in the ability of the driver caused by a transient condition change or the like, thereby enabling appropriate evaluation of the driving ability originally possessed by the driver. Accordingly, the driving-related function to be subject to substitution control can be selected appropriately.

In addition, in the present disclosure, preferably, the vehicle control unit detects the traffic environment of the vehicle, sets a target travel route according to the detected traffic environment, and sets a control target value of the vehicle to travel on the target travel route, and the ability evaluation unit evaluates the ability of the driver based on a deviation between the control target value and a control value of the vehicle that corresponds to the driving operation of the driver.

According to the present disclosure configured as described above, the ability of the driver can be evaluated based on the control target value set according to the traffic environment and the driving ability can be evaluated appropriately in consideration of the traffic environment. Accordingly, the driving-related function to be subject to substitution control can be selected appropriately.

In addition, in the present disclosure, preferably, the ability evaluation unit identifies a driving-related function that requires the driver to have relatively high ability among the plurality of driving-related functions based on the traffic environment and sets, as the evaluation of the identified driving-related function, evaluation of the ability of the driver based on the deviation between the control target value and the control value of the vehicle that corresponds to the driving operation.

According to the present disclosure configured as described above, since the plurality of driving-related functions influence each other (for example, error in perception leads to error in determination), by identifying the driving-related function that requires relatively high ability in the traffic environment (that is, the driving-related function for which inadequacy of ability easily occurs), the driving ability can be evaluated appropriately for the driving-related function that easily influences the driving operation of the driver in the traffic environment. Accordingly, the driving-related function to be subject to substitution control can be selected appropriately.

In addition, a vehicle driving support method according to another aspect of the present disclosure includes an ability evaluation step of evaluating ability of a driver based on a driving operation of the driver for each of a plurality of driving-related functions possessed by the driver to drive a vehicle; a determination step of, based on a past evaluation result of the ability of the driver, determining whether the ability of the driver is less than a predetermined standard and is not improved from then on for each of the driving-related functions; and a vehicle control step of, when it is determined in the determination step that the ability of the driver is less than the predetermined standard for at least a part of the driving-related functions and is not improved from then on, performing substitution control for causing the vehicle to perform the part of the driving-related functions instead so as to perform driving even if the driver does not exert the ability of the driver.

The present disclosure configured as described above can also maintain and improve the driving ability of the driver.

Advantages

The vehicle driving support system and the vehicle driving support method according to the present disclosure can maintain and improve the driving ability of the driver.

BRIEF DESCRIPTION OF THE DRAWINGS

FIG. 5 is a flowchart of driving ability determination processing performed by the vehicle driving support system according to the embodiment of the present disclosure.

DESCRIPTION OF EMBODIMENTS

Figure 1:
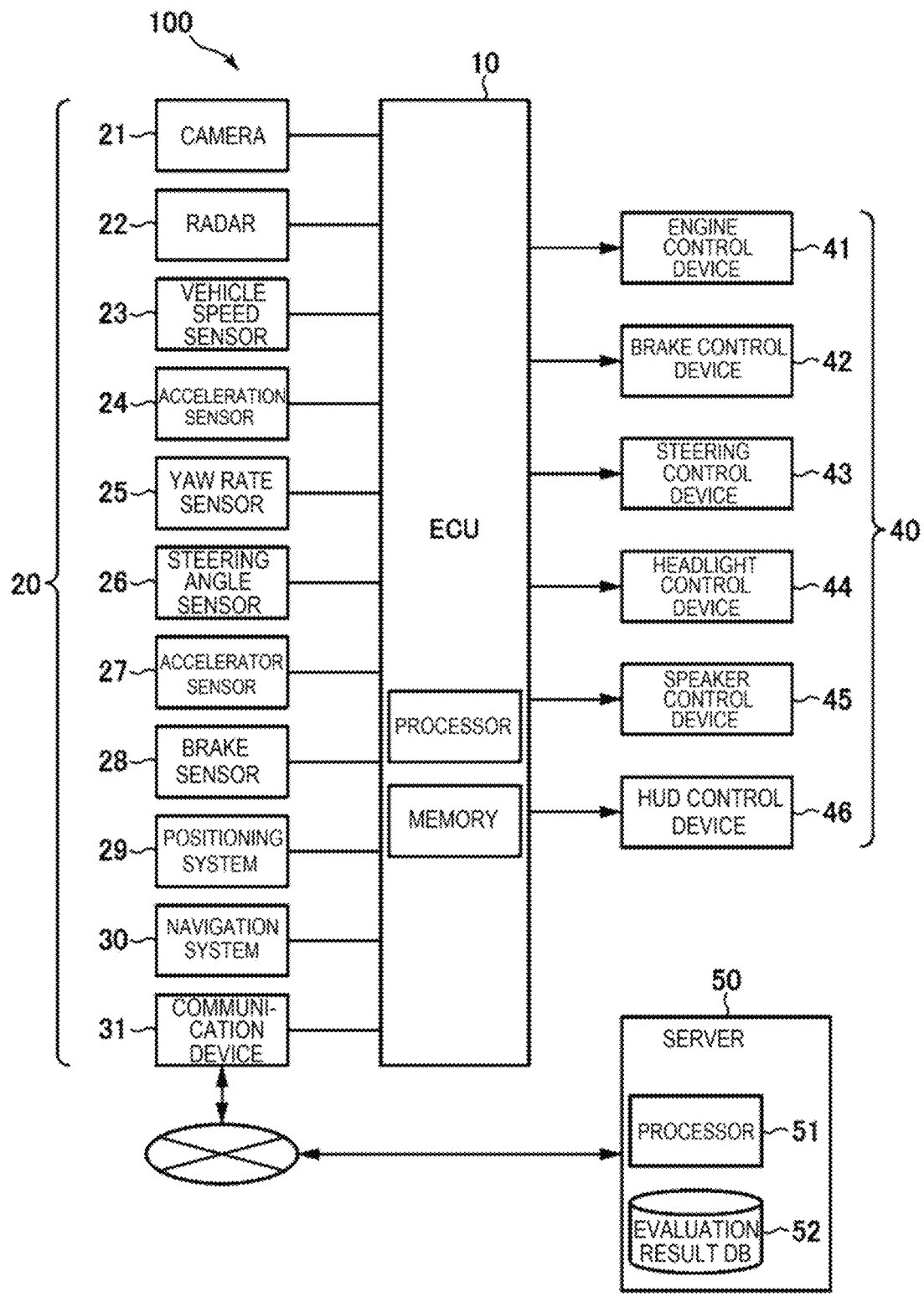
FIG. 1 is a structural diagram of a vehicle driving support system according to an embodiment of the present disclosure.

A vehicle driving support system and a vehicle driving support method according to an embodiment of the present disclosure will be described with reference to the attached drawings. First, the structure of the vehicle driving support system according to the embodiment will be described with reference to FIG. 1. FIG. 1 is a structural diagram of the vehicle driving support system.

As illustrated in FIG. 1, a vehicle driving support system 100 mainly includes an electronic control unit (ECU) 10 installed in a vehicle 1, an in-vehicle device 20, a control device 40, and a server 50 connected communicably to a communication device 31 of the in-vehicle device 20 via a wireless network.

The in-vehicle device 20 includes an in-vehicle camera 21, a radar 22, a plurality of sensors (a vehicle speed sensor 23, an acceleration sensor 24, and a yaw rate sensor 25) that detect the behavior of the vehicle 1, and a plurality of sensors (a steering angle sensor 26, an accelerator sensor 27, and a brake sensor 28) that detect an operation by a driver, a positioning system 29, a navigation system 30, and a communication device 31.

In addition, the control device 40 includes an engine control device 41, a brake control device 42, a steering control device 43, a headlight control device 44, a speaker control device 45, and a head-up display (HUD) control device 46.

The ECU 10 is a computer device that includes a processor, a memory that stores various programs to be executed by the processor, an input-output device, and the like. The ECU 10 outputs a control signal for vehicle control (substitution control and support control) to the control device 40 based on a signal received from the in-vehicle device 20. In the embodiment, the ECU 10 acts as an ability evaluation unit, a determination unit, and a vehicle control unit.

The in-vehicle camera 21 includes an external camera that takes images of the surroundings (typically the front of the vehicle 1) of the vehicle 1 and outputs image data, and an internal camera that takes an image of the driver of the vehicle 1 and outputs image data. The ECU 10 determines the facial expression and the posture of the upper body of the driver and identifies objects outside the vehicle based on the image data above. The objects include surrounding moving bodies (such as vehicles and pedestrians) and non-moving structures (such as obstacles, parked vehicles, travel roads, demarcation lines, stop lines, traffic lights, traffic signs, and intersections).

The radar 22 measures the positions and speeds of objects around (typically in front of the vehicle 1) the vehicle 1. For example, the radar 22 may be a millimeter-wave radar, a laser radar (LIDAR), an ultrasonic sensor, or the like.

The vehicle speed sensor 23 detects the speed (vehicle speed) of the vehicle 1. The acceleration sensor 24 detects the acceleration of the vehicle 1. The yaw rate sensor 25 detects the yaw rate generated in the vehicle 1. The steering angle sensor 26 detects the rotating angle (steering angle) of the steering wheel of the vehicle 1. The accelerator sensor 27 detects the amount of depression of the accelerator pedal. The brake sensor 28 detects the amount of depression of the brake pedal.

The positioning system 29 includes a GPS receiver and/or a gyroscope sensor and detects the position (current vehicle position information) of the vehicle 1. The navigation system 30 stores map information internally and can provide the map information for the ECU 10. The ECU 10 can calculate the travel route (including travel lanes, intersections, traffic lights, and the like) to the destination based on the map information and the current vehicle position information. The communication device 31 communicates with the external server 50 via a wireless network, transmits the evaluation result of the driving ability of the driver provided by the ECU 10 to the server 50, receives information about driving support control from the server 50, and provides the received information for the ECU 10. In addition, the communication device 31 receives various types of driving information and traffic information (such as traffic congestion information and speed limit information) via vehicle-to-vehicle communication with other vehicles and road-to-vehicle communication with communication devices outside the vehicle and provides the received information for the ECU 10.

The engine control device 41 controls the drive force of the engine (such as the internal combustion engine or the electric motor) of the vehicle 1. The engine control device 41 includes actuators such as the throttle valves and fuel injection valves of the internal combustion engine, a battery and an inverter that supply electric power to the electric motor, and an actuator for the accelerator pedal. The ECU 10 can accelerate or decelerate the vehicle 1 by transmitting a control signal to the engine control device 41.

The brake control device 42 controls the braking force by the braking device of the vehicle 1. The brake control device 42 includes, for example, brake actuators such as a hydraulic pump and a valve unit and an actuator for the brake pedal. The ECU 10 can decelerate the vehicle by transmitting a control signal to the brake control device 42.

The steering control device 43 controls the steering device of the vehicle 1. The steering control device 43 includes, for example, the electric motor of the electric power steering system. The ECU 10 can change the travel direction of the vehicle 1 by transmitting a control signal to the steering control device 43.

The headlight control device 44 controls the intensity distribution of adaptive headlights. The speaker control device 45 can provide auditory information for the driver by controlling, for example, the speaker. The head-up display control device 46 can provide visual information for the driver by controlling, for example, an AR-HUD.

The server 50 is a computer device that includes a processor 51, an evaluation result database (DB) 52 that stores the evaluation results of the driving ability of the driver received from the vehicle 1, a memory that stores various programs to be executed by the processor 51, input-output devices, and the like. The server 50 analyzes the past evaluation result of the driving ability of the driver stored in the evaluation result DB 52 and transmits information about driving support control to the vehicle 1 based on the result of the analysis. In the embodiment, the server 50 functions as the determination unit.

Next, driving support control processing of the vehicle driving support system 100 according to the embodiment will be described. In the driving support control according to the embodiment, the vehicle driving support system 100 evaluates the ability of the driver based on the driving operation of the driver for each of the driving-related functions possessed by the driver to drive the vehicle 1. Then, the vehicle driving support system 100 performs the substitution control that causes the vehicle 1 to perform the driving-related function instead or perform the support control that supports the driving-related functions based on the past evaluation result of the driver.

The driving-related functions are a plurality of functions possessed by the driver to drive the vehicle. Specifically, the driver has, as the driving-related functions, at least the perceptual function, the determination function, and the operation function (or physical function) and exerts the perceptual performance, the determination performance, and the exercise performance using these driving-related functions. The driver perceives the traffic environment using the perceptual function (perceptual performance), selects the driving operation to be performed using the determination function in the perceived traffic environment (determination performance), and performs the selected driving operation using the operation function with an appropriate operation amount and at an appropriate timing (exercise performance). On the other hand, the vehicle has, as the travel functions, at least the running function, the stop function, and the turn function and exerts the travel performance, the braking performance, and the operation stability performance using these travel functions.

As described above, the driver operates the vehicle by exerting the perceptual performance, the determination performance, and the exercise performance and the vehicle exerts the travel performance, the braking performance, and the operation stability performance, so that the vehicle, as a human-machine system, can achieve safe driving. The vehicle conventionally has interfaces that intervene between the functions of the driver and the functions of the vehicle so as to efficiently exert the three functions of the vehicle, further improving the comprehensive vehicle performance (such as, for example, the braking ability and the fuel consumption).

At the time of automatic driving, the vehicle performs all or almost all of the perceptual function, the determination function, and the operation function of the driver instead. For example, the perceptual function is performed by the in-vehicle camera or the acceleration sensor instead. The determination function is performed by the computer of the vehicle instead. The physical function is performed by in-vehicle actuators instead. The driver only needs to have the physical function that gives a minimum instruction such as starting of the engine and does not need to have most of the driving-related functions and the driving abilities (driving performance).

In the case of the driver (for example, a beginner or elderly person) with poor driving ability, at least any of the abilities (the perceptual performance, the determination performance, and the exercise performance) about the driving-related functions (perceptual function, determination function, and operation function) are at a low level. In addition, in the case of the driver (normal driver) with an average driving ability as well, any or all of the driving performance may be at a low level depending on the physical condition, the mental condition, and the like at the time of driving.

When determining that the ability of the driver is less than the predetermined standard for at least a part of the driving-related functions and is not improved from then on (that is, irreversible inadequacy of ability is caused), the vehicle driving support system 100 according to the embodiment performs the substitution control that causes the vehicle to perform the inadequate driving-related functions instead so as to perform driving even if the driver does not exert the ability of the driver. In this case, the in-vehicle device 20, the ECU 10, and the control device 40 of the vehicle 1 perform the inadequate driving-related functions instead and exert the performance required for travel.

In addition, when determining that the ability of the driver is less than the predetermined standard and can be improved from then on (that is, reversible inadequacy of ability is caused) or the ability of the driver is equal to or more than the predetermined standard and is on a declining trend for at least a part of the driving-related functions, the vehicle driving support system 100 according to the embodiment performs support control that causes the vehicle 1 to support the exertion of the ability of the driver. In this case, the inadequate ability of the driver is compensated or the improvement of the ability of the driver is promoted by causing the in-vehicle device 20, the ECU 10, and the control device 40 of the vehicle 1 to perform various types of support control about the inadequate driving-related function.

Figure 2:
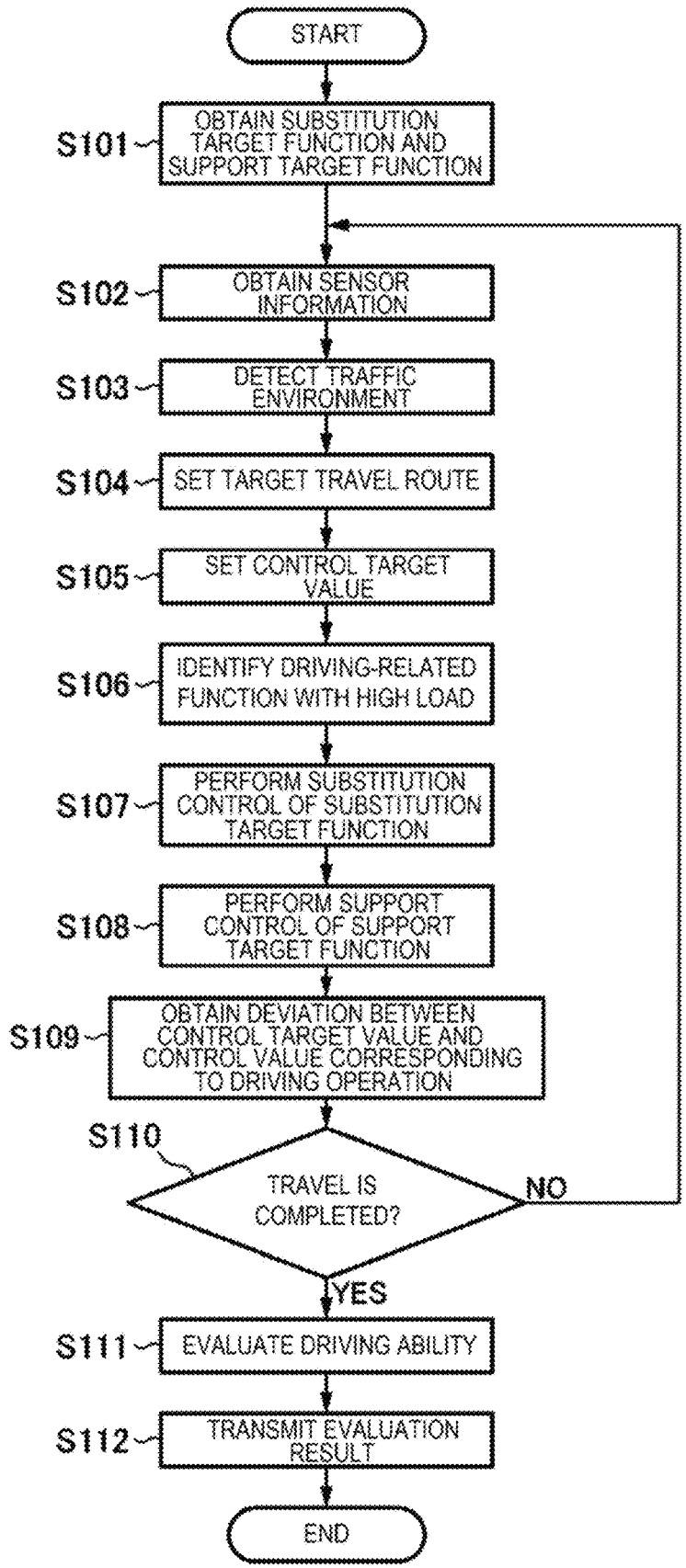
FIG. 2 is a flowchart of driving support control processing performed by the vehicle driving support system according to the embodiment of the present disclosure.
Figure 3:
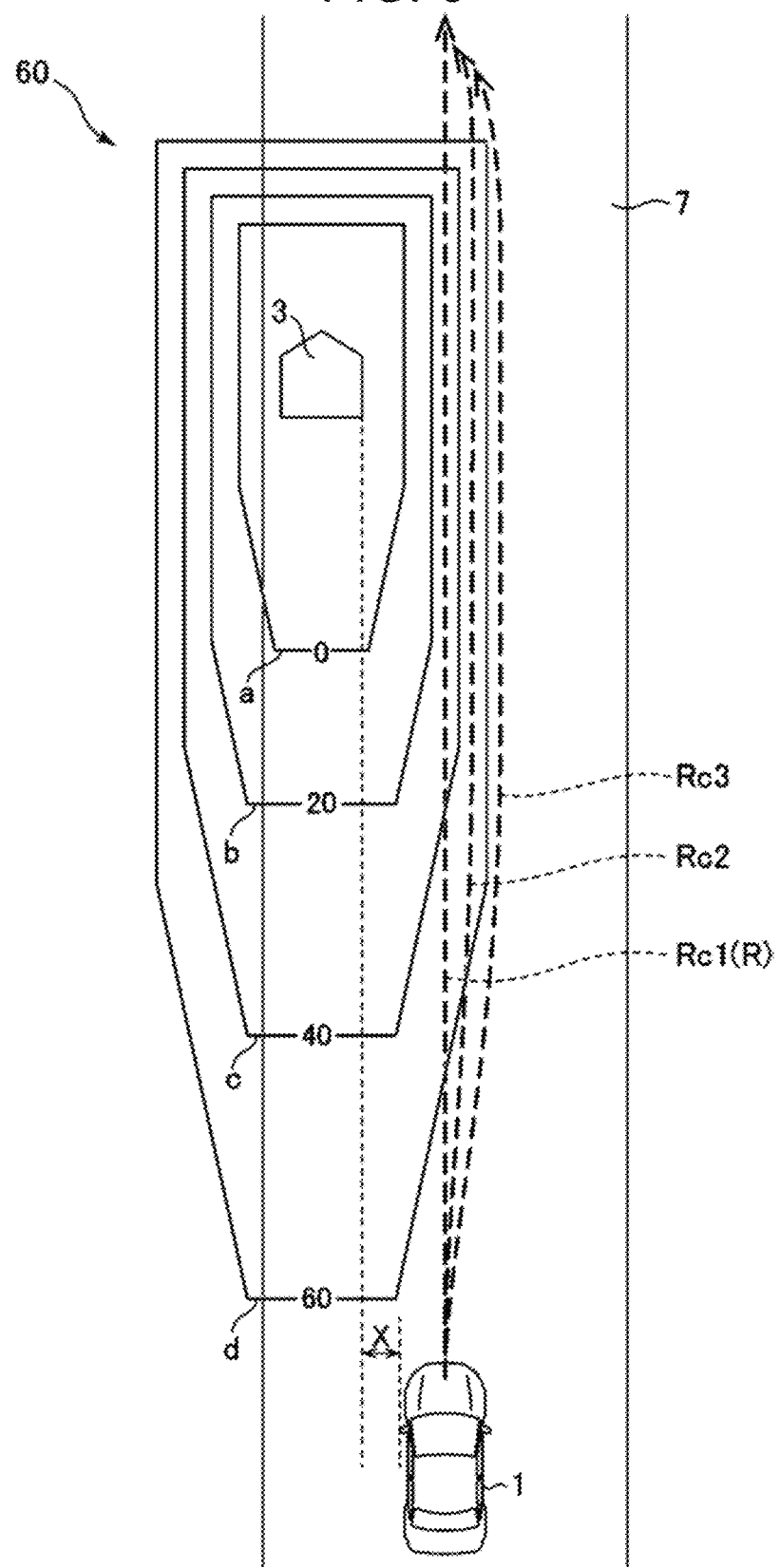
FIG. 3 is an explanatory diagram illustrating a target driving route in the vehicle driving support system according to the embodiment of the present disclosure.
Figure 4A:
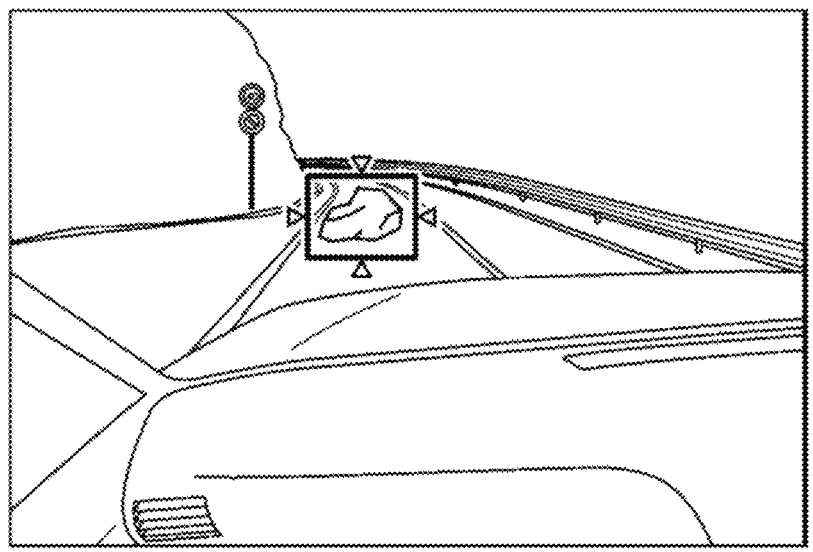
FIG. 4A is an explanatory diagram illustrating substitution control of a perceptual function of the vehicle driving support system according to the embodiment of the present disclosure.
Figure 4B:
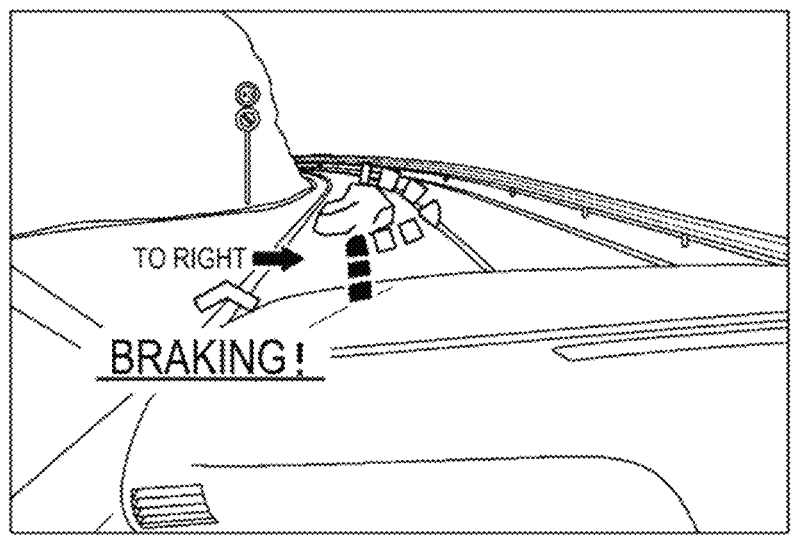
FIG. 4B is an explanatory diagram illustrating the substitution control of a determination function of the vehicle driving support system according to the embodiment of the present disclosure.
Figure 4C:
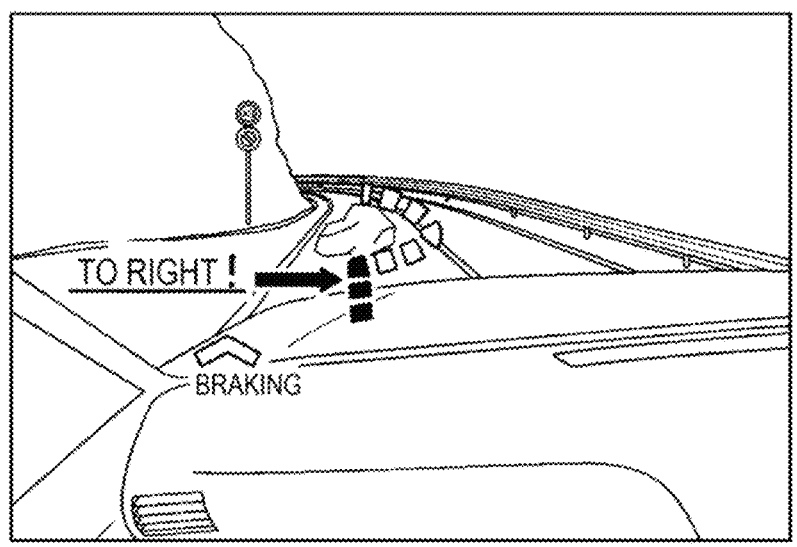
FIG. 4C is an explanatory diagram illustrating the substitution control of the determination function of the vehicle driving support system according to the embodiment of the present disclosure.

The driving support control processing by the vehicle driving support system 100 according to the embodiment will be described with reference to FIGS. 2 to 4. FIG. 2 is a flowchart of the driving support control processing according to the embodiment, FIG. 3 is an explanatory diagram illustrating a target driving route in the vehicle driving support system 100 according to the embodiment, and FIGS. 4A to 4C are explanatory diagrams illustrating the substitution control by the vehicle driving support system according to the embodiment.

The ECU 10 starts the driving support control processing illustrated in FIG. 2 when, for example, the ignition switch of the vehicle 1 is turned on.

After starting the driving support control processing, the ECU 10 first obtains the substitution target function subject to substitution control and the support target function subject to support control among the driving-related functions from the server 50 via a communication device 38 (step S101). In driving ability determination processing described later, since the server 50 has preset the substitution target function and the support target function based on the past evaluation result of the driving ability of the driver, the server 50 transmits the substitution target function and the support target function at that time to the communication device 38 in response to a request from the communication device 38 of the vehicle 1.

Next, the ECU 10 obtains various types of information from the in-vehicle device 20 via an in-vehicle communication line (step S102). For example, the ECU 10 obtains the current vehicle position information and map information from the positioning system 29 and the navigation system 30 and obtains sensor information from the in-vehicle camera 21, the radar 22, the vehicle speed sensor 23, the acceleration sensor 24, the yaw rate sensor 25, the accelerator sensor 27, the brake sensor 28, and the like.

Next, the ECU 10 detects the traffic environment based on the information obtained in step S102 (step S103). For example, the ECU 10 detects, based on the current vehicle position information, map information, and the sensor information, travel road information about the travel road shape in the surroundings and the front area of the vehicle (presence or absence of straight sections and curved sections, lengths of these sections, curvature radiuses of curved sections, widths of lanes, positions of both ends of lanes, number of lanes, presence or absence of intersections, speed limits defined by curvatures, and the like), driving regulation information (speed limit, red light, and the like), and information about the tracks of the preceding vehicles (positions and speeds of the preceding vehicles). The ECU 10 also detects, based on the information input from the in-vehicle camera 21 and the radar 22, the positions and speeds of objects (vehicles, pedestrians, boundaries, stop lines, traffic signs, and the like) around the vehicle 1. This processing for detecting the traffic environment can replace the perceptual function of the driving-related functions.

Next, the ECU 10 sets the target travel route based on the information obtained in step S102 and the traffic environment detected in step S103 (step S104). For example, as illustrated in FIG. 3, in a situation in which the vehicle 1 is traveling on the travel road (lane) 7 and is passing and moving ahead of the vehicle 3 which is traveling or stops, the ECU 10 sets a plurality of candidates Rcn (n=1, 2, 3) for the target travel route. The candidates Rcn for the travel route is identified by the target position (Px_k) and the target speed (Vx_k) of the vehicle 1 on the travel route (k=0, 1, 2, ..., n). This processing for setting the target travel route can replace the determination function of the driving-related functions.

In general, the driver of the vehicle 1 drives the vehicle 1 so as to eliminate dangers in consideration of the relationship between the distances (including the lateral and longitudinal distances) between obstacles (such as, for example, preceding vehicles, parked vehicles, the pedestrian) on or near the road and the vehicle 1, and the relative speed therebetween.

Accordingly, in the embodiment, as illustrated in FIG. 3, the ECU 10 sets a two-dimensional distribution (speed distribution area 60) that defines the allowable upper limit of the relative speed in the travel direction of the vehicle 1 around (over the lateral, backward, and forward regions) an obstacle (for example, a parked vehicle 3) detected from the vehicle 1 or at least between the obstacle and the vehicle 1. In the speed distribution area 60, the allowable upper limit Vlim of the relative speed is set at individual points around the obstacle. In the embodiment, the travel route is corrected so that the relative speed of the vehicle 1 with respect to the obstacle does not exceed the allowable upper limit Vlim within the speed distribution area 60 in all driving support modes.

As can be seen from FIG. 3, the speed distribution area 60 is set so that the allowable upper limit of the relative speed is essentially smaller as the lateral and longitudinal distances from the obstacle (as the vehicle 1 is closer to the obstacle) are smaller. In addition, for ease of understanding, FIG. 3 indicates constant relative speed lines that connect the points with the equal allowable upper limit. Constant relative speed lines a, b, c, and d correspond to allowable upper limits Vlim of 0 km/h, 20 km/h, 40 km/h, and 60 km/h, respectively. In this example, the constant relative speed areas are set to be substantially rectangular. Then, the candidates for the target travel route are set so as to meet these allowable upper limits.

It should be noted that the speed distribution area 60 does not necessarily have to be set across the circumference of the obstacle as long as the speed distribution area 60 is set at least behind the obstacle and on one side (the area on the right side of the vehicle 3 in FIG. 3) in the lateral direction of the obstacle on which the vehicle 1 is present.

In addition, the speed distribution area 60 can be set based on various parameters. The parameters may be, for example, the relative speed between the vehicle 1 and the obstacle, the type of the obstacle, the travel direction of the vehicle 1, the movement direction and movement speed of the obstacle, the length of the obstacle, the absolute speed of the vehicle 1, and the like. In addition, in the embodiment, the obstacle includes a vehicle, a pedestrian, a bicycle, a cliff, a ditch, a hole, a fallen object, or the like. Furthermore, the vehicle can be distinguished among an automobile, a truck, and a motorcycle. The pedestrian can be distinguished among an adult, a child, and a group.

When the vehicle 1 is traveling on a travel road 7 as illustrated in FIG. 3, the ECU 10 of the vehicle 1 detects the obstacle (vehicle 3) based on image data from the in-vehicle camera 21. At this time, the ECU 10 identifies the type of the obstacle (a vehicle or a pedestrian in this case).

In addition, the ECU 10 calculates the position and relative speed of the obstacle (vehicle 3) with respect to the vehicle 1 and the absolute speed of the obstacle based on the measurement data of the radar 22 and the vehicle speed data of the vehicle speed sensor 23. It should be noted that the position of the obstacle includes the x-direction position (longitudinal distance) along the travel direction of the vehicle 1 and the y-direction position (lateral distance) along the lateral direction orthogonal to the travel direction.

The ECU 10 sets the speed distribution area 60 for each of the detected obstacles (vehicle 3 in the case in FIG. 3). Then, the ECU 10 sets the candidates for the target travel route so that the speed of the vehicle 1 does not exceed the allowable upper limit Vlim of the speed distribution area 60.

That is, if the target speed exceeds the allowable upper limit defined by the speed distribution area 60 at a certain target position when the vehicle 1 travels on a temporarily set target travel route, then the target speed is reduced with the target position unchanged (route Rc1 in FIG. 3), the target position is changed on a detour route so that the target speed does not exceed the allowable upper limit with the target speed unchanged (route Rc3 in FIG. 3), or both the target position and the target speed are changed (route Rc2 in FIG. 3).

For example, FIG. 3 illustrates the case in which the temporarily set target travel route R without considering the parked vehicles 3 in front thereof to reduce the calculation load is the route on which the vehicle 1 travels at 60 km/h (target speed) in the middle position (target position) in the width direction of the travel road 7.

When traveling on the target travel route R, the vehicle l crosses the constant relative speed lines d, c, c, and d in the speed distribution area 60 in this order. That is, the vehicle 1 traveling at 60 km/h enters the area inside the constant relative speed line d (allowable upper limit Vlim is 60 km/h). Accordingly, the ECU 10 generates the candidate Rc1 for the target travel route by correcting the target travel route R so as to restrict the target speed at each of the target positions on the target travel route R to less than or equal to the allowable upper limit Vlim. That is, in the case of the candidate Rc1 for the target travel route, the target vehicle speed is gradually reduced to less than 40 km/h toward the vehicle 3 and then gradually increased to the original speed of 60 km/h with distance from the vehicle 3 so that the target speed is less than or equal to the allowable upper limit Vlim at each of the target positions.

In addition, the candidate Rc3 for the target travel route is a route in which the target speed (60 km/h) of the target travel route R is not changed and the vehicle 1 thereby travels outside the constant relative speed line d (equivalent to the relative speed of 60 km/h). The ECU 10 sets the candidate Rc3 for the target travel route by correcting the target travel route R to change the target position so that the target position is located on or outside the constant relative speed line d to set the candidate Rc3 of the target travel route. Accordingly, the target speed of the candidate Rc3 for the target travel route is maintained at 60 km/h, which is the target speed of the target travel route R.

In addition, the candidate Rc2 for the target travel route is a route for which both the target position and the target speed of the target travel route R have been changed. In the candidate Rc2 for the target travel route, the target speed is not maintained at 60 km/h and is gradually reduced toward the vehicle 3, and then the target speed is gradually increased to the original speed of 60 km/h with distance from the vehicle 3.

After setting the candidate Rcn for the target travel route in step S104, the ECU 10 selects the optimum candidate based on a predetermined evaluation function and a predetermined constraint condition from the candidates Rcn, sets the selected optimum candidate as the target travel route, and sets the control target value for causing the vehicle 1 to travel on the target travel route (step S105). The control target value includes, for example, the target values of the steering angle and the acceleration and deceleration at each of the target positions and, based on these target values, the ECU 10 generates command signals to be output to the corresponding control device 40 so that the vehicle 1 travels on the target travel route. This processing for setting the control target value can replace at least a part of operation functions in the driving-related functions.

Next, based on the traffic environment, the ECU 10 identifies one or more driving-related functions with high load for the target travel route for which the control target value has been set in step S105 (step S106). For example, the ECU 10 determines that the load on the perceptual function is high in the case in which the number of obstacles (perceived objects) on the target travel route is equal to or more than a predetermined value (for example, 2), in the case of night time (after sunset before sunrise), or in the case of bad weather such as rain or fog. In addition, the ECU 10 determines that the load on the determination function is high when the number of types of operations required to travel on the target travel route is large (for example, when two or more of the accelerator pedal, the brake pedal, the steering wheel, and the direction indicator need to be operated) or when a lane change or a right or left turn is performed. In addition, the ECU 10 determines that the load on the operation function is high when a complex or precise operation is required, such as when the amplitude change or the change speed of the control target value is equal to or more than a predetermined value, when the number of operations or the operation speed required to travel on the target travel route is equal to or more than a predetermined value, when the lane width of the target travel route is equal to or less than a predetermined value, or when the road surface μ is equal to or less than a predetermined value. The ECU 10 stores the driving-related function determined to have high load in the memory in association with the position on the target travel route.

Next, the ECU 10 performs the substitution control of the substitution target function obtained from the server 50 in step S101 based on the control target value set in step S105 (step S107).

For example, when the substitution target function is the perceptual function, the ECU 10 outputs, to the head-up display control device 46, a control command for highlighting the obstacle (perceived object) on the target travel route on the AR-HUD. In the example illustrated in FIG. 4A, an obstacle (fallen rock) on the target travel route is highlighted with a square frame and triangular arrows on the AR-HUD. As described above, when the driver cannot extract and perceive the obstacle on the travel route and the recovery thereof is not expected (that is, when the perceptual performance of the driver is irreversibly low), the ECU 10 can cause the driver to perceive the obstacle by automatically extracting the obstacle on the target travel route instead of the driver and highlight the extracted obstacle on the AR-HUD. That is, the vehicle 1 performs the exertion of the perceptual performance using the perceptual function instead of the driver.

Alternatively, when the substitution target function is the determination function, the ECU 10 outputs, to the head-up display control device 46, a control command for displaying the order and details of driving operations to be performed to travel on the target travel route on the AR-HUD. In the example in FIGS. 4B and 4C, the target travel route (dotted line) for bypassing the obstacle (fallen rock) on the target travel route is set, and instructions are displayed on the AR-HUD so as to first slow down the vehicle 1 by a braking operation (FIG. 4B) and then change the travel direction of the vehicle 1 to the right (FIG. 4C) by turning the steering wheel clockwise (FIGS. 4B and 4C). As described above, when the driver cannot select the driving operation to be performed to avoid the obstacle on the travel route and the recovery thereof is not expected (that is, when the determination performance of the driver is irreversibly low) even if the driver perceives the obstacle, the ECU 10 can indicate the driving operations required to travel on the target travel route to the driver by automatically selecting the driving operation (that is, the driving operation necessary to achieve the control target value) to be performed to travel on the target travel route instead of the driver and displaying the selected driving operation on the AR-HUD. That is, the vehicle 1 performs the exertion of the determination performance using the determination function instead of the driver.

Alternatively, when the substitution target function is the operation function, the ECU 10 outputs a command signal to the corresponding control device 40 so that the vehicle 1 travels on the target travel route based on the control target value set in step S105. As described above, when the driver cannot perform the driving operation required to avoid the obstacle on the travel route with the appropriate operation amount and at the appropriate timing and the recovery thereof is not expected (that is, the exercise performance of the driver is irreversibly low), the ECU 10 can cause the control device 40 to automatically perform the driving operation required to travel on the target travel route instead of the driver. That is, the vehicle 1 performs the exertion of the exercise performance using the operation function instead of the driver.

Next, the ECU 10 perform support control of the support target function obtained from the server 50 in step S101 based on the control target value set in step S105 (step S108).

For example, when the support target function is the perceptual function, the ECU 10 outputs a control command for illuminating an obstacle (perceived object) on the target travel route with the headlights to the head light control device 44. As described above, when the driver cannot extract and perceive the obstacle on the travel route, but there is a possibility of recovery thereof or when the driver can perceive the obstacle, but the perception is becoming gradually difficult (that is, when the perceptual performance of the driver is reversibly low or when the perceptual performance is adequate but is on a declining trend), it is possible to cause the driver to easily perceive the obstacle on the target travel route by illuminating the obstacle with headlights. That is, the vehicle 1 makes up for the inadequacy of the perceptual performance or the vehicle 1 promotes the improvement of the perceptual performance using the perceptual function.

Alternatively, when the support target function is the determination function, the ECU 10 compares the order and details of driving operations to be performed to travel on the target travel route with the order and details of actual driving operations by the driver. When a difference is present (that is, when error is present in the driving operation by the driver), the ECU 10 outputs, to the head-up display control device 46 or the speaker control device 45, a control command for causing the display to indicate or the speaker to audibly output the correct order and details of driving operations after the event. As described above, when the driver cannot select the driving operation to avoid the obstacle on the travel route even if the driver perceives the obstacle, but there is a possibility of recovery thereof or when the driver can select an appropriate driving operation but the selection is becoming gradually difficult (that is, when the determination performance of the driver is reversibly low or when the determination performance is adequate but is on a declining trend), it is possible to cause the driver to know the presence of determination error in the driving operation or appropriate determination by outputting, through the display or the speaker, information indicating determination error of the driver and teaching an appropriate driving operation. That is, the vehicle 1 makes up for the inadequacy of the determination performance or the vehicle 1 promotes the improvement of the determination performance using the determination function.

Alternatively, when the support target function is the operation function, the ECU 10 outputs a command signal to the corresponding control device 40 so as to increase the assist torque of the power steering, increase the assist force of the accelerator pedal or the brake pedal, or bias the power steering, the accelerator pedal, and the brake pedal so as to approach the control target value set in step S105. As described above, when the driver cannot perform the driving operation required to avoid the obstacle on the travel route with the appropriate operation amount and at the appropriate timing, but there is a possibility of recovery thereof or when the driver can perform the driving operation with the appropriate operation amount and at the appropriate timing, but the driving operation is becoming gradually difficult (that is, when the exercise performance of the driver is reversibly low or when the exercise performance is adequate, but is on a declining trend), it is possible to make the final operation amount and the final timing appropriate and to cause the driver to experience the appropriate operation amount and the appropriate timing by assisting the operations of the steering wheel, the accelerator pedal, and the brake pedal. That is, the vehicle 1 makes up for the inadequacy of the exercise performance or the vehicle 1 promotes the improvement of the exercise performance using the operation function.

Next, the ECU 10 obtains the deviation between the control target value set in step S105 and the control value of the vehicle 1 that corresponds to the driving operation of the driver (step S109). For example, the ECU 10 obtains the deviation of the control values of the steering angle and the acceleration and deceleration output to the control device 40 according to the driving operation when the vehicle 1 passes the target positions (or the positions closest to the target positions) from the target values of the steering angle and acceleration and deceleration at the target positions set in step S105. Then, the ECU 10 stores the target positions and the obtained deviation values in the memory in association with each other.

Next, the ECU 10 determines whether the vehicle 1 has finished traveling (step S110). The ECU 10 determines that the vehicle 1 has finished traveling when, for example, the ignition switch of the vehicle 1 is turned off. When determining that the vehicle 1 has not finished traveling in step S110 (No in step S110), the ECU 10 returns to step S102. After that, the ECU 10 repeats the processing of steps S102 to S109 until determining that the vehicle 1 has finished traveling.

When determining that the vehicle 1 has finished traveling in step S110 (Yes in step S110), the ECU 10 evaluates the driving ability of the driver in the current travel based on the deviation between the control target value obtained by the processing in step S109 during the travel and the control value that corresponds to the driving operation (step S111).

For example, the ECU 10 extracts the evaluation sections in which the driving-related functions have been determined to have high load in the processing of step S106. As the average value (for example, the amount of deviation per unit time or per unit length in the evaluation sections) of the deviation between the control target value and the control value that corresponds to the driving operation in each of the extracted evaluation sections becomes larger, the driving ability of the driving-related function determined to have high load in the section is evaluated to be lower. For example, the ECU 10 evaluates the perceptual performance of the driver by calculating the score of the perceptual performance based on the average value of the deviation between the control target value and the control value that corresponds to the driving operation in the evaluation section in which the perceptual function has been determined to have high load. The score of the driving ability can be expressed by a value that is larger as the driving ability is higher, for example. In each of the evaluation sections in this travel, the ECU 10 calculates the score of the driving ability of each of the driving-related functions determined to have high load in the evaluation section and then obtains the average value of the score of the driving ability of each of the driving-related functions as the evaluation result of the driving ability of each of the driving-related functions in this travel.

Next, the ECU 10 associates the evaluation result of the driving ability obtained in step S111 with the ID for identification and the date and time of evaluation, transmits this evaluation data to the server 50 via the communication device 31 (step S112), and ends the driving support control processing.

Figure 6:
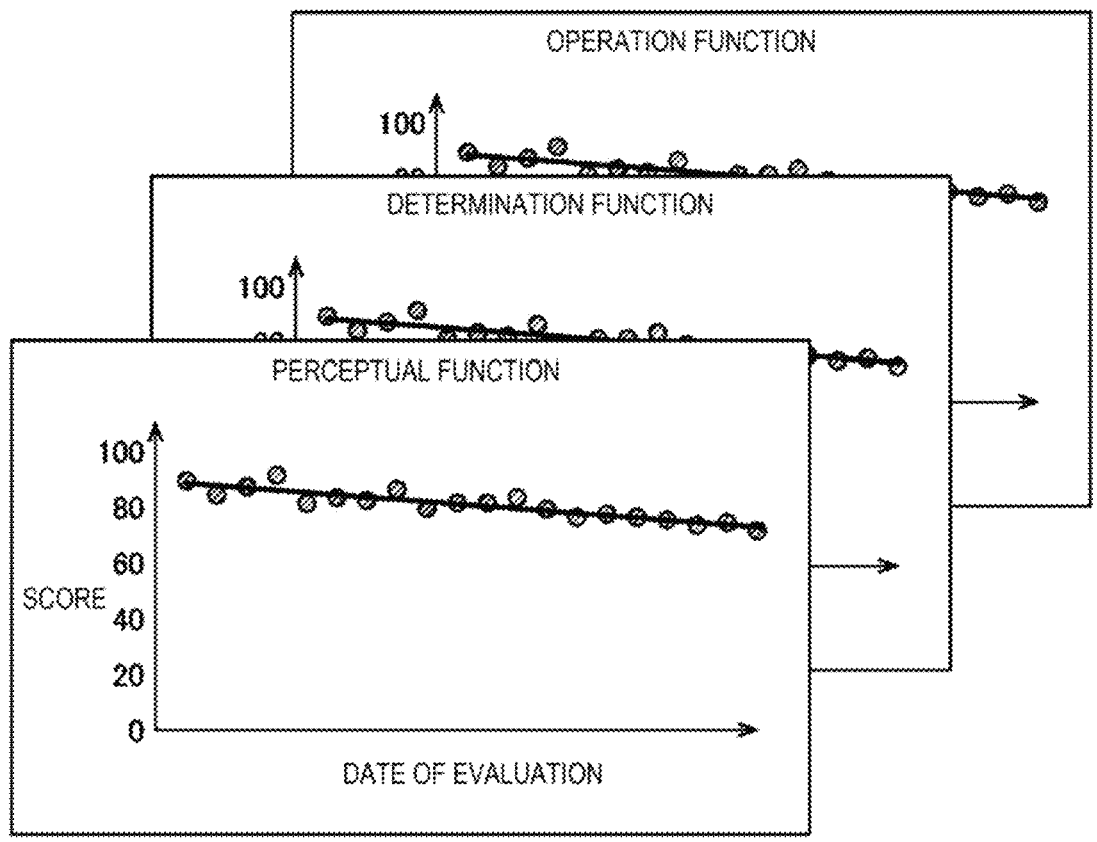
FIG. 6 is an explanatory diagram illustrating the evaluation of driving ability by the vehicle driving support system according to the embodiment of the present disclosure.

Next, the driving ability determination processing of the vehicle driving support system 100 according to the embodiment will be described with reference to FIGS. 5 and 6. FIG. 5 is a flowchart of the driving ability determination processing according to the embodiment and FIG. 6 is an explanatory diagram illustrating the evaluation of the driving ability according to the embodiment.

After receiving the evaluation result of the driving ability from, for example, the vehicle 1, the server 50 starts the driving ability determination processing illustrated in FIG. 5. The driving ability determination processing is performed for each of the driving-related functions.

After starting the driving ability determination processing, the server 50 obtains the evaluation result received from the vehicle 1 and updates the data in the evaluation result database 52 (step S201). As illustrated in FIG. 6, the evaluation result database 52 stores the past evaluation result (the scores of the driving ability) for each of the driving-related functions. After obtaining a new evaluation result from the vehicle 1, the server 50 adds the evaluation result of each of the driving-related function to the evaluation result database 52.

Next, the server 50 analyzes the past evaluation results of the driving ability stored in the updated evaluation result database 52 (step S202). For example, the server 50 calculates, for each of the driving-related functions, the average value, the variance, and the change rate (the slope of a linear function expressing the score with respect to the time) of the driving ability scores in the latest predetermined period (for example, one year). It should be noted that, when the period of the evaluation results of the driving ability stored in the evaluation result database 52 is less than one year or when the number of pieces of the evaluation result data is less than a predetermined number (for example, 24), then the driver may be presumed to be a novice and the driving-related functions may be unconditionally set to the support target functions.

Next, the server 50 determines whether the ability of the driver is less than the predetermined standard (that is, the ability of the driver is inadequate) for each of the driving-related functions based on the analysis of the evaluation results in step S202 (step S203). For example, the server 50 determines that the ability of the driver for the driving-related function is inadequate when the average value of the driving ability score in the latest predetermined period (for example, one year) is less than a predetermined value (for example, 80).

When determining that the ability of the driver is inadequate for each of the driving-related functions (Yes in step S203), the server 50 determines whether the ability of the driver for the driving-related function is not improved (that is, the ability of the driver cannot be improved) from then on (step S204). For example, the server 50 determines that the ability of the driving-related function cannot be improved when the variance of the driving ability score in the latest predetermined period (for example, one year) is less than a predetermined value. This is because there is room for improvement in the driving ability of the driver when the difference between high driving ability and low driving ability is large (that is, the variance is large), while the driving ability is always low in some degree when the improvement of the ability is not expected (that is, the variance is small).

When determining that the ability of the driver cannot be improved for each of the driving-related functions (Yes in step S204), the server 50 sets the driving-related function to the substitution target function (step S205). The driving-related function that is set to the substitution target function here is subject to substitution control in the subsequent operation support control.

In contrast, when determining that the ability of the driver is not inadequate (that is, adequate) in step S203 for each of the driving-related functions (No in step S203), the server 50 determines whether the ability of the driver for the driving-related function is on a declining trend (step S206). For example, the server 50 determines that the ability of the driving-related function is on a declining trend when the change rate of the driving ability score in the latest predetermined period (for example, one year) is negative.

When determining that the ability of the driver is on a declining trend for each of the driving-related functions (Yes in step S206), the server 50 sets the driving-related function to the support target function (step S207). In addition, even when determining that the ability of the driver can be improved for the driving-related function for which the ability of the driver is inadequate in step S204 (No in step S204), the server 50 sets the driving-related function to the support target function (step S207).

After performing the processing in step S205 or S207, the server 50 ends the driving ability determination processing. Alternatively, when determining that the ability of the driver is not on a declining trend for each of the driving-related functions in step S206 (No in step S206), since the ability of the driver for the driving-related function is adequate and is not on a declining trend, the server 50 ends the driving ability determination processing without setting the driving-related function to the substitution target function or the support target function.

Although an embodiment of the present disclosure has been described above, the specific structure and means of the present disclosure may be modified and improved within the scope of the technical concept of each of the aspects described in the claims. Such modifications will be described below.

First of all, the problem to be solved by the disclosure and the advantage of the disclosure are not limited to the above descriptions, the present disclosure may solve a problem not described above and obtain an advantage not described above, or may solve only part of the problem described above and obtain only part of the advantage described above.

Although the driving support control processing is performed by the ECU 10 of the vehicle 1 and the driving ability determination processing is performed by the server 50 in the example in the embodiment described above, part or all of the processing described above may be performed by any of the ECU 10 and the server 50.

In addition, the substitution control and the support control described above are examples and, depending on each of the driving-related functions, various types of substitution control that perform the driving-related function instead and various types of support control that support the exertion of the ability of the driver for the driving-related function may be adopted.

Finally, the operation and effect of the vehicle driving support system 100 according to the embodiment and a modification of the embodiment will be described.

The vehicle driving support system 100 according to the embodiment evaluates the ability of the driver based on the driving operation of the driver for each of the driving-related functions possessed by the driver to drive the vehicle. In addition, the vehicle driving support system 100 determines whether the ability of the driver is less than the predetermined standard for each of the driving-related functions and is not improved from then on, based on the past evaluation result of the ability of the driver. When determining that the ability of the driver is less than the predetermined standard for at least a part of the driving-related functions and is not improved from then on, the vehicle driving support system 100 performs the substitution control that causes the vehicle to perform the driving-related function instead so as to perform driving even if the driver does not exert the ability.

As described above, in the embodiment, the vehicle 1 performs the driving performance instead using the driving-related function for which the ability of the driver is determined to be less than the predetermined standard and not to be improved from then on. This can cause the vehicle 1 to perform the function for which the driver has poor driving ability instead and exert the performance required for a travel so as to ensure the safety driving of the vehicle 1, and cause the driver to exert the driving performance for the function for which the driver has adequate driving ability without entrusting the vehicle 1. Accordingly, the driving ability of the driver can be maintained and improved through driving while a safety travel is ensured by automatic driving.

In addition, the vehicle driving support system 100 determines whether the ability of the driver is on a declining trend for each of the driving-related functions based on the past evaluation result of the ability of the driver. When determining that the ability of the driver is less than the predetermined standard and can be improved from then on or the ability of the driver is equal to or more than the predetermined standard and is on a declining trend for at least a part of the driving-related functions, the vehicle driving support system 100 performs support control that causes the vehicle 1 to support the exertion of the ability of the driver.

As described above, in the embodiment, the vehicle 1 performs various types of support control of the driving-related function for which the ability of the driver is determined to be less than the predetermined standard and can be improved from then on or the ability of the driver is determined to be equal to or more than the predetermined standard and is on a declining trend. For the driving-related function for which there is room for improvement in the driving ability of the driver, the vehicle 1 does not simply perform this driving-related function instead, but the vehicle 1 makes up for the inadequacy of the ability of the driver or promotes the improvement of the ability of the driver while causing the driver to actively exert the driving performance. Accordingly, the driving ability of the driver can be maintained and improved through driving.

In addition, in the embodiment, the driving-related functions include the perceptual function that perceives the traffic environment, the determination function that determines the driving operation required in the traffic environment, and the operation function that performs the driving operation. Since the driving-related functions are classified according to the processes of driving operation as described above, the ability of the driver can be evaluated appropriately. Accordingly, the driving-related functions to be subject to the substitution control or support control can be selected appropriately.

In addition, in the embodiment, the vehicle driving support system 100 evaluates the ability of the driver each time a travel starts and then ends, and determines the driving ability based on the evaluation results of the ability of the driver over a plurality times of travels. This can suppress effects of a temporary change in the ability of the driver caused by a transient condition change or the like and appropriately evaluate the driving ability originally possessed by the driver. Accordingly, the driving-related functions to be subject to substitution control or support control can be selected appropriately.

In addition, in the embodiment, the vehicle driving support system 100 detects the traffic environment of the vehicle 1, sets the target travel route according to the detected traffic environment, and sets the control target value of the vehicle to travel on the target travel route. Then, the vehicle driving support system 100 evaluates the ability of the driver based on the deviation between the control target value and the control value of the vehicle that corresponds to the driving operation of the driver. Accordingly, the ability of the driver can be evaluated based on the control target value set according to the traffic environment and the driving ability can be evaluated appropriately in consideration of the traffic environment. Accordingly, the driving-related functions to be subject to substitution control or support control can be selected appropriately.

In addition, in the embodiment, the vehicle driving support system 100 identifies the driving-related function that requires the driver to have relatively high ability among the plurality of driving-related functions based on the traffic environment and sets, as the evaluation of the identified driving-related function, the evaluation of the ability of the driver that is based on the deviation between the control target value and the control value of the vehicle 1 that corresponds to the driving operation. Since the plurality of driving-related functions influence each other (for example, error in perception leads to error in determination), by identifying the driving-related function (that is, the driving-related function for which inadequacy of ability easily occurs) that requires relatively high ability in the traffic environment, the driving ability can be evaluated appropriately for the driving-related function that easily influences the driving operation of the driver in the traffic environment. Accordingly, the driving-related function to be subject to substitution control or support control can be selected appropriately.

DESCRIPTION OF REFERENCE SIGNS AND NUMERALS

1: vehicle
10: ECU
20: in-vehicle device
21: in-vehicle camera
22: radar
23: vehicle speed sensor
24: acceleration sensor
25: yaw rate sensor
26: steering angle sensor
27: accelerator sensor
28: brake sensor
29: positioning system
30: navigation system
31: communication device
40: control device
41: engine control device
42: brake control device
43: steering control device
44: headlight control device
45: speaker control device
46: head-up display (HUD) control device
50: server
51: processor
52: evaluation result database
100: vehicle driving support system

The invention claimed is:

1. A vehicle driving support system comprising:
circuitry configured to:
evaluate ability of a driver based on a driving operation of the driver for each of a plurality of driving-related functions possessed by the driver to drive a vehicle, wherein the driving-related functions include a perceptual function that perceives a traffic environment, a determination function that determines a driving operation required in the traffic environment, and an operation function that performs the driving operation;
determine, based on a past evaluation result of the ability of the driver, whether the ability of the driver is less than a predetermined standard and is not improved from then on for each of the driving-related functions; and
when it is determined that the ability of the driver is less than the predetermined standard for at least a part of the driving-related functions and is not improved from then on, performs substitution control for causing the vehicle to perform the part of the driving-related functions instead so as to perform driving even if the driver does not exert the ability.

2. The vehicle driving support system according to claim 1,
wherein the circuitry evaluates the ability of the driver each time a travel starts and then ends, and
the circuitry determines whether the ability of the driver is less than the predetermined standard and is not improved from then on for each of the driving-related functions, based on the evaluation result of the ability of the driver over a plurality times of travels.

3. The vehicle driving support system according to claim 2,
wherein the circuitry detects the traffic environment of the vehicle, sets a target travel route according to the detected traffic environment, and sets a control target value of the vehicle to travel on the target travel route, and
the circuitry evaluates the ability of the driver based on a deviation between the control target value and a control value of the vehicle that corresponds to the driving operation of the driver.

4. The vehicle driving support system according to claim 3,
wherein the circuitry identifies a driving-related function that requires the driver to have an ability among the plurality of driving-related functions based on the traffic environment and sets, as the evaluation of the identified driving-related function, evaluation of the ability of the driver based on the deviation between the control target value and the control value of the vehicle that corresponds to the driving operation.

5. The vehicle driving support system according to claim 1,
wherein the circuitry evaluates the ability of the driver each time a travel starts and then ends, and
the circuitry determines whether the ability of the driver is less than the predetermined standard and is not improved from then on for each of the driving-related functions, based on the evaluation result of the ability of the driver over a plurality times of travels.

6. The vehicle driving support system according to claim 5,
wherein the circuitry detects the traffic environment of the vehicle, sets a target travel route according to the detected traffic environment, and sets a control target value of the vehicle to travel on the target travel route, and
the circuitry evaluates the ability of the driver based on a deviation between the control target value and a control value of the vehicle that corresponds to the driving operation of the driver.

7. The vehicle driving support system according to claim 6,
wherein the circuitry identifies a driving-related function that requires the driver to have an ability among the plurality of driving-related functions based on the traffic environment and sets, as the evaluation of the identified driving-related function, evaluation of the ability of the driver based on the deviation between the control target value and the control value of the vehicle that corresponds to the driving operation.

8. The vehicle driving support system according to claim 1,
wherein the circuitry detects the traffic environment of the vehicle, sets a target travel route according to the detected traffic environment, and sets a control target value of the vehicle to travel on the target travel route, and
the circuitry evaluates the ability of the driver based on a deviation between the control target value and a control value of the vehicle that corresponds to the driving operation of the driver.

9. The vehicle driving support system according to claim 8,
wherein the circuitry identifies a driving-related function that requires the driver to have an ability among the plurality of driving-related functions based on the traffic environment and sets, as the evaluation of the identified driving-related function, evaluation of the ability of the driver based on the deviation between the control target value and the control value of the vehicle that corresponds to the driving operation.

10. The vehicle driving support system according to claim 1,
wherein the circuitry detects the traffic environment of the vehicle, sets a target travel route according to the detected traffic environment, and sets a control target value of the vehicle to travel on the target travel route, and
the circuitry evaluates the ability of the driver based on a deviation between the control target value and a control value of the vehicle that corresponds to the driving operation of the driver.

11. The vehicle driving support system according to claim 10,
wherein the circuitry identifies a driving-related function that requires the driver to have an ability among the plurality of driving-related functions based on the traffic environment and sets, as the evaluation of the identified driving-related function, evaluation of the ability of the driver based on the deviation between the control target value and the control value of the vehicle that corresponds to the driving operation.

12. The vehicle driving support system according to claim 10, wherein when the circuitry determines that the ability of the driver is less than the predetermined standard for the perceptual function and recovery is not improved from then on, the circuitry, as the substitution control, extracts an obstacle on the target travel route and highlights the extracted obstacle on an augmented reality head up display.

13. The vehicle driving support system according to claim 10, wherein when the circuitry determines that the ability of the driver is less than the predetermined standard for the determination function and is not improved from then on, the circuitry, as the substitution control, selects the driving operation to be performed by the driver to travel on the target travel route and displays the selected driving operation on a display.

14. The vehicle driving support system according to claim 10, wherein when the circuitry determines that the ability of the driver is less than the predetermined standard for the operation function and is not improved from then on, the circuitry, as the substitution control, controls the vehicle based on the control target value set by the circuitry, not based on the control value that corresponds to the driving operation of the driver.

15. A vehicle driving support method comprising:
evaluating ability of a driver based on a driving operation of the driver for each of a plurality of driving-related functions possessed by the driver to drive a vehicle, wherein the driving-related functions include a perceptual function that perceives a traffic environment, a determination function that determines a driving operation required in the traffic environment, and an operation function that performs the driving operation;
determining, based on a past evaluation result of the ability of the driver, whether the ability of the driver is less than a predetermined standard and is not improved from then on for each of the driving-related functions; and
when it is determined in the determining that the ability of the driver is less than the predetermined standard for at least a part of the driving-related functions and is not improved from then on, performing substitution control for causing the vehicle to perform the part of the driving-related functions instead so as to perform driving even if the driver does not exert the ability of the driver.

16. A non-transitory computer-readable medium storing executable instructions, which when executed by circuitry, cause the circuitry to perform a vehicle driving support method comprising:
evaluating ability of a driver based on a driving operation of the driver for each of a plurality of driving-related functions possessed by the driver to drive a vehicle, wherein the driving-related functions include a perceptual function that perceives a traffic environment, a determination function that determines a driving operation required in the traffic environment, and an operation function that performs the driving operation;
determining, based on a past evaluation result of the ability of the driver, whether the ability of the driver is less than a predetermined standard and is not improved from then on for each of the driving-related functions; and
when it is determined in the determining that the ability of the driver is less than the predetermined standard for at least a part of the driving-related functions and is not improved from then on, performing substitution control for causing the vehicle to perform the part of the driving-related functions instead so as to perform driving even if the driver does not exert the ability of the driver.

* * * * *